June 3, 1952   J. AGIN   2,598,874
TACHOMETER DEVICE
Filed Sept. 2, 1948
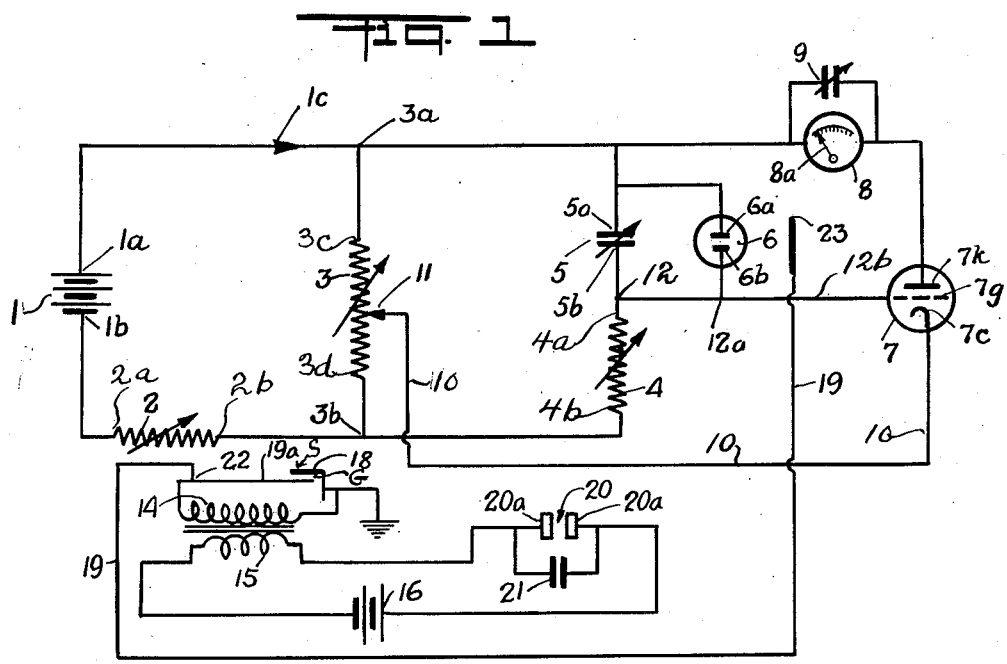
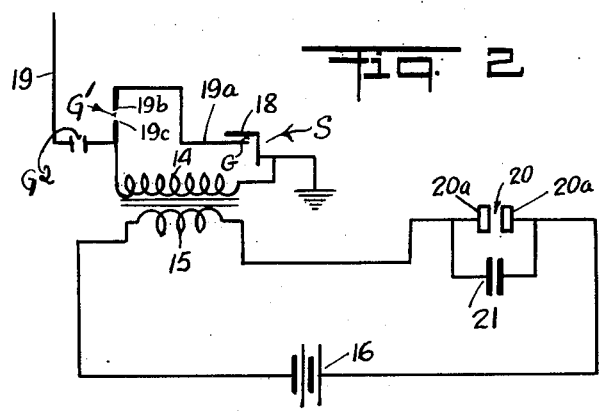
INVENTOR.
Julius Agin
BY Mock & Blum
ATTORNEYS Patented June 3, 1952

2,598,874

UNITED STATES PATENT OFFICE 2,598,874

TACHOMETER DEVICE

Julius Agin, Bergenfield, N. J., assignor to Patterson O. Stewart, Bronxville, N. Y.

Application September 2, 1948, Serial No. 47,379

1 Claim. (Cl. 175—183)

My invention relates to a new and improved tachometer device and method for measuring the number of revolutions per minute of an internal combustion engine of the spark-plug type.

I provide a tachometer device which is coupled to one of the spark plugs of the engine, in order to measure the frequency of the firing of such spark plug.

The improved tachometer device includes a discharge tube, such as a glow discharge tube, means coupled to the ignition system of the engine for firing said discharge tube at each firing of the spark plug, and means for producing successive discharges of identical energy through said discharge tube during the successive firings of the associated spark plug.

I use a discharge tube which has an ionizable filling, to produce an ionization discharge. Such discharge tubes are fully described in "Theory and Applications of Electron Tubes," by Reich, published in 1939 by McGraw-Hill Company, Inc.

Such a tube requires a minimum applied starting voltage or overvoltage to start the ionization discharge through the ionizable filling of such tube. This starting voltage exceeds the striking voltage, which greatly exceeds the operating voltage, due to the negative characteristic of the tube. When such applied voltage drops below the extinction voltage of the tube, the discharge ceases.

The circuit of the tachometer device includes a source of unidirectional and constant voltage P, which is less than the starting or firing voltage of the discharge tube. Said voltage P is applied to the electrodes of the discharge tube, and also to a condenser or capacitor which is connected to the power terminals of said source, said condenser being in shunt relative to the discharge tube.

Hence, if the discharge tube is not started by the firing of the associated spark plug, a stable condition is reached in which the condenser is charged to voltage P, and there is no discharge through the discharge tube. Such stable condition exists between successive firings of the discharge tube.

I couple the varying field of the ignition system to the ionizable filling of the glow-tube, so that each firing pulse of said variable field, which fires the spark plug, also produces a single temporary ionization of said ionizable filling, thus starting the discharge through the tube. When the tube is thus started, the condenser discharges very quickly through the tube to the extinction voltage, because the charging circuit of the condenser has much greater resistance than the discharge circuit of the condenser through the ignited tube. I thus produce successive pulses of unidirectional discharge current through the tube. These pulses are of identical energy, and there is one discharge pulse for each firing of the spark plug. The energy of the respective recharging pulses is identical with the energy of the respective charge pulses.

I can measure the sum or constant-current value of the energy of these discharge pulses by means of a suitable meter which is located in series between one terminal of the condenser and one electrode of the glow tube. This meter may be a thermocouple meter or a vane-type meter, which operates as a wattmeter, or it may be an ammeter.

I can optionally amplify these discharge pulses by means of a conventional electronic amplifier which has one or more stages, in order to produce corresponding amplified pulses of plate current, which are of equal energy, and measure these pulses of plate current.

As applied to testing an internal combustion engine, the improved method and device are independent of (a) the number of cylinders of the engine; (b) the type of ignition system of the engine; this ignition system may be of the magneto type or battery type; and (c) the voltage of the battery of the ignition system of the engine, if the engine has a battery ignition system.

As another improvement, I provide an auxiliary spark gap in series with the spark gap of the spark plug, during the test. This auxiliary spark gap is of adjustable length.

Every ignition system has an ignition coil whose ends are connected to the firing electrodes of the spark plug. In order to fire a spark plug, the voltage across the ignition coil must be raised to the firing voltage of the spark plug. The greatest single factor for the firing voltage which is required to produce the firing spark in the spark plug, is the pressure in the cylinder at the time of firing the spark plug. This cylinder pressure depends upon the extent to which the throttle of the engine is open, and the compression ratio. The effect of engine speed upon the required firing voltage of the spark plug is very slight. When the engine is idling, a low firing voltage is required to fire the spark plug, because the throttle is then only slightly open, and the cylinder pressure is low.

When the engine is laboring under heavy load at low speed, the throttle is wide open, the cylinder pressure is a maximum, and a maximum firing voltage is required to fire the spark plug.

The auxiliary gap restricts the range of voltage in said ignition coil during the test, between these two extremes of firing voltage. The ignition coil cannot fire the spark plug until such ignition voltage reaches a minimum value which can be regulated by adjusting the length of the auxiliary gap, which is in series with the gap of the spark plug. During the test, the conditions can therefore be set to correspond to the operation of the engine at average or normal speed under normal load. The auxiliary spark gap produces a more uniform and stable ionization of the filling of the glow tube.

Numerous additional objects and features of my invention are stated in the annexed description and drawings.

Fig. 1 is a circuit diagram which includes the optional electronic amplifier; and Fig. 2 is a detail view which illustrates the auxiliary spark gap.

The relaxation discharge device which is a part of the improved tachometer device, includes a source of unidirectional and constant voltage, which is exemplified by battery 1, which has a positive power terminal 1a and a negative power 1b. Current flows in the direction of arrow 1c. The circuit points 3a and 3b are connected by adjustable potentiometer resistor 3, which has ends 3c and 3d. Circuit point 3b is connected to negative power terminal 1b through adjustable resistor 2, which has respective ends 2a and 2b. By adjusting the relative resistances of resistors 3 and 2, the IR drop between circuit points 3a and 3b can be adjusted to P.

An adjustable condenser 5, which has respective ends 5a and 5b, is connected to the power terminals 1a and 1b. An adjustable resistor 4 of high resistance, as 200,000 ohms, is included between end 5b and circuit point 3b. Said resistor 4 has respective ends 4a and 4b. The charging circuit of condenser 5 therefore includes resistors 2 and 4 and excludes potentiometer 3.

The upper end 5a of condenser 5 is connected to electrode 6a of diode glow tube 6. The lower end 5b of condenser 5 is connected to point 12 which is anterior end 4a of resistor 4. Said point 12 is connected by wire 12b to the control grid 7g of an electronic amplifier tube 7. Said tube 7 is of the usual highly evacuated type. It has a heated, electron-emitting cathode 7c, and an anode 7k.

Electrode 6b of diode glow tube 6 is connected to point 12a of wire 12b and hence to end 5b of condenser 5.

The cathode 7c is heated by conventional means, not shown, to produce the emission of electrons.

Said cathode 7c is connected by wire 10 and adjustable connector 11 to a selected point of potentiometer resistor 3.

The positive power terminal 1a and end 5a of condenser 5 are connected to one terminal of a meter 8, whose other terminal is connected to anode or plate 7k.

The applied voltage P between circuit points 3a and 3b is any desired fraction of the voltage of battery 1. This fraction can be selected by adjusting resistor 2.

As above noted, said potential P is below the ignition voltage of glow tube 6, which exemplifies a discharge device which has a falling or negative characteristic.

Unless the filling of glow tube 6 is ionized independently of voltage P, the condenser 5 will remain charged at voltage P, and there will be no discharge through tube 6. In such case, the upper and lower ends 5a and 5b of condenser 5 are at the respective potentials of power terminals 1a and 1b.

Fig. 1 conventionally shows the parts of a battery ignition system. This system has an ignition battery 16, whose circuit includes the primary coil 15 of the usual step-up transformer. The circuit of battery 16 through primary coil 15 is closed by contacting the breaker points 20a of the usual breaker 20, and said circuit is opened by separating said breaker points 20a. The usual condenser 21 is connected in shunt across the breaker points 20a. When said breaker points 20a are separated by the timer of the engine, condenser 21 is connected in series with primary coil 15 and battery 16. The primary current rapidly decreases when breaker 20 is thus opened, rapidly charging condenser 21. This results is a very sharp decrease in the magnetic flux through secondary coil 14, thus producing a rapid and large difference of potential between its ends, as 15,000–20,000 volts. The current and voltage which are induced in coil 14 have one or more alternating pulses.

The spark-plug S has a grounded electrode 18 and an ungrounded electrode 19a, with a firing gap G. The ends of secondary coil 14 are connected to said electrodes in the usual manner.

One end of a starting wire or member 19 is connected to the end of coil 14 which is connected to ungrounded electrode 19a, said end of coil 14 being remote from firing gap G.

In this embodiment, there is little or no magnetic coupling between starting wire 19 and coil 14. Such magnetic coupling may be provided. During each firing of the spark plug S, one or more alternating current pulses are produced in starting wire 19, due to the changing potential of the respective connected end of coil 14. The wire 19 operates like a transmitting antenna.

The starter end 23 of wire 19 is located externally to tube 6 in this embodiment, without limiting the invention to such external position. By using a sensitive glow tube 6 of a well-known commercial type, each energy pulse in wire 19 will temporarily ionize the gaseous or vapor filling of glow tube 6. The starter end 23 may be straight and parallel to the axis of the discharge gap between electrodes 6a and 6b, or said end 23 may be coiled helically around tube 6, around said axis.

The operation of the circuit of Fig. 1 is as follows:

At each firing of spark plug S, the starter wire 19 temporarily ionizes the filling of diode discharge tube 6. Condenser 5 then discharges very rapidly through discharge tube 6, with a much higher discharge rate than its charging rate. The voltage across condenser 5 falls very rapidly to extinction voltage, thus extinguishing the discharge through tube 6. The condenser 5 is recharged to potential P, during the interval between successive firings of the spark plug S.

The discharge current through tube 6 consists of pulses of equal energy, and the condenser 5 is recharged in pulses of said equal energy.

When the tube 6 is not discharging and condenser 5 is at potential P, the potential of cathode 7c is the potential of the selected point of potentiometer 3, and the potential of grid 7g is the potential of circuit point 3b. Grid 7g will then have a negative bias relative to cathode 7c. This negative bias is preferably a blocking bias, so that no anode current then passes through meter 8 or electronic tube 7.

At the end of each discharge of condenser 5, it will be at a respective fixed minimum voltage, so that it will be recharged by respective current pulses of identical energy.

During each discharge of condenser 5, there is no change of the bias of grid 7g.

During each charging of condenser 5, charging current will flow through resistors 4 and 2, so that there will be an IR drop of potential between ends 4a and 4b, and another IR drop of potential between ends 2b and 2a. This IR drop will be mainly through resistor 4, which may have much greater resistance than resistor 2. This IR drop will maintain the circuit point 12 of grid 7g at a higher potential than circuit point 3b and negative terminal 1b. This IR drop will diminish as the charging current diminishes.

This IR drop will make grid 7g positive relative to cathode 7c, or will at least unblock tube 7, at the beginning of each recharging period. The tube 7 will remain unblocked during a selected part of each recharging period, depending on the capacity of condenser 5 and the resistance between point 12 and negative power terminal 1b.

The essential factor is the voltage difference between circuit point 12 and the point of potentiometer 3 to which the connector 11 is connected.

Hence a pulse of anode current and meter current will flow through meter 8 and electronic tube 7, during each recharging period of condenser 5. These pulses of meter current will be of identical amperage and wattage. The meter 8 will indicate the wattage of these anode current pulses. The meter 8 may be of any type. It may be an ordinary ammeter, which has sufficient mechanical or electric inertia so that its pointer 8a will indicate the constant current value of the pulses of anode current through meter 8 and tube 7.

The anode current pulses have alternating current components. In using an ordinary direct current ammeter 8, the function of condenser 9 is to provide a low impedance by-pass for said alternating current components, so that pointer 8a will assume a substantially stationary position to indicate the constant current value of the unidirectional components of the anode current pulses.

Fig. 2 shows the auxiliary spark gap G′, which is in series with gap G of spark plug S. The electrodes 19b and 19c of spark gap G′ are adjustable, in order to vary the length of spark gap G′.

One end of starter or firing wire 19 is connected to the ungrounded end of secondary coil 14. The spark gap G′ is thus adjusted, until the induced voltage across coil 14 must reach a selected minimum, before the spark plug S can be fired during the test, with resultant temporary ionization of the filling of the discharge tube 6.

Since the recharging current of condenser 5 becomes very small at the end of the recharging period, at which time the voltage of condenser 5 is close to P, the tube 7 will be blocked before the end of the respective recharging period. However, the anode and meter pulses will be identical during each recharging period.

If the electronic amplifier is omitted and meter 8 is connected directly between the condenser 5 and tube 6, as between end 5a and electrode 6a, the condenser 5 will discharge unidirectionally and directly through said meter 8 in a succession of identical discharge pulses, whose constant current value will be indicated by meter 6.

The reading of meter 8 will thus correspond to the frequency at which a spark plug of the test engine is fired.

The determination of the frequency of spark plug firing also indicates the revolutions per minute of the engine, because the timer is driven from the crank shaft of the engine. The test device is therefore a simple and accurate tachometer device.

The battery 1 may be replaced by a source of rectified alternating current, either full-wave or half-wave, combined with the usual filter system for producing constant and unidirectional voltage.

Also the grid bias can be secured by means of a conventional auxiliary battery, thus eliminating the use of potentiometer 3.

In any case, the high resistance of resistor 4 is an important factor. Thus, if the resistance of resistor 4 is substantially 200,000 ohms, the resistance of resistor 2 is substantially 10,000 ohms and the resistance of potentiometer 3 is substantially 50,000 ohms. Hence, while the condenser 5 is charged, substantially the entire IR drop is anterior the point 3b and through the resistor 4.

The wire 19 may be connected through a second auxiliary spark gap $G^2$ to the respective end of the ignition coil 14, so that the operation of the tachometer will accurately indicate the frequency of the firings of the selected spark plug of the engine. Otherwise, the firing of other spark plugs of a multi-cylinder engine may cause undesired firings of the tube 6. The second auxiliary spark gap $G^2$ fixes a minimum of voltage for firing the glow-tube 6, so that stray coupling resulting from the firing of the non-selected spark plugs cannot fire the glow-discharge tube 6.

During its discharge, the internal resistance of tube 6 is very low in comparison to the resistance of the charging circuit of condenser 5.

I have disclosed preferred embodiments of my invention, but numerous changes and omissions and additions can be made without departing from its scope.

I claim:

A tachometer device for measuring the speed of rotation of an internal combustion engine which has a spark-plug ignition system which includes an ignition coil which supplies the sparking voltage in sparking voltage pulses at successive intervals, said tachometer device comprising a source of unidirectional and constant power voltage which has a positive power terminal and a negative power terminal, a potentiometer connected across said terminals, a condenser connected across said terminals by direct wire connection in a charging circuit which excludes said potentiometer, a discharge tube which has an ionizable filling and a striking voltage and an extinction voltage, the ends of said condenser being connected to said discharge tube in a discharge circuit of said condenser, said power voltage being less than the ignition voltage of said discharge tube, a starting member located to temporarily ionize said filling when a starting current pulse is supplied to said starting member, said starting member being coupled to said ignition coil of said engine to receive a starting current pulse during each sparking voltage pulse, said starting current pulses being received at successive intervals, the resistance of said discharge circuit when said filling is ionized being sufficiently below the resistance of said charging circuit to lower the voltage of said condenser during each said discharge thereof to a lower voltage at which said discharge tube is extinguished, the periods between said successive intervals being sufficiently long to recharge said condenser from said lower voltage to said power voltage between successive discharges of said condenser, said condenser discharging unidirectionally through said discharge tube in a series of respective discharge pulses at said temporary ionizations of said filling and being recharged in a series of recharge pulses during the periods between said intervals, said discharge pulses and recharge pulses being equal to each other, an electronic amplifier tube which has an anode and a heated electron-emitting cathode and an input grid, a meter, said meter being connected between said positive terminal and said anode, said cathode being connected to a point of said potentiometer to maintain said cathode negative relative to said anode, said charging circuit having a resistor between said negative power terminal and the proximate end of said condenser, said grid being connected to said charging circuit between said proximate end and said resistor, said electronic tube passing a series of pulses of anode current during said recharging pulses, said meter indicating the average energy value of said anode current pulses.

JULIUS AGIN.

REFERENCES CITED

The following references are of record in the file of this patent:

UNITED STATES PATENTS

| Number | Name | Date |
| --- | --- | --- |
| 2,026,421 | Fecker | Dec. 31, 1935 |
| 2,068,147 | Miller | Jan. 19, 1937 |
| 2,161,146 | Eichlin | June 6, 1939 |
| 2,226,185 | Sturm et al. | Dec. 24, 1940 |
| 2,232,959 | Miller | Feb. 25, 1941 |